United States Patent
Poeppel et al.

(10) Patent No.: US 10,843,572 B2
(45) Date of Patent: Nov. 24, 2020

(54) HIGH-VOLTAGE BATTERY FOR A MOTOR VEHICLE, AND MOTOR VEHICLE

(71) Applicant: AUDI AG, Ingolstadt (DE)

(72) Inventors: Armin Poeppel, Gaimersheim (DE); Thomas Glass, Mainburg (DE)

(73) Assignee: AUDI AG, Ingolstadt (DE)

( * ) Notice: Subject to any disclaimer, the term of this patent is extended or adjusted under 35 U.S.C. 154(b) by 366 days.

(21) Appl. No.: 15/773,700

(22) PCT Filed: Oct. 21, 2016

(86) PCT No.: PCT/EP2016/075441
§ 371 (c)(1),
(2) Date: May 4, 2018

(87) PCT Pub. No.: WO2017/080797
PCT Pub. Date: May 18, 2017

(65) Prior Publication Data
US 2018/0326855 A1 Nov. 15, 2018

(30) Foreign Application Priority Data
Nov. 10, 2015 (DE) .................. 10 2015 222 137

(51) Int. Cl.
*H01M 4/42* (2006.01)
*H01M 2/10* (2006.01)
(Continued)

(52) U.S. Cl.
CPC ........... *B60L 11/1818* (2013.01); *B60L 50/64* (2019.02); *B60L 53/16* (2019.02); *H01M 2/1077* (2013.01);
(Continued)

(58) Field of Classification Search
CPC ........................... H01M 10/1077; B60L 50/64
See application file for complete search history.

(56) References Cited

U.S. PATENT DOCUMENTS 8,691,416 B1 4/2014 Carroll et al.
2007/0216226 A1 9/2007 Matsumoto et al.
(Continued)

FOREIGN PATENT DOCUMENTS

CN 102376918 A 3/2012
CN 103718374 A 4/2014
(Continued)

OTHER PUBLICATIONS

Translation of International Preliminary Report on Patentability dated May 24, 2018 of corresponding International application No. PCT/EP2016/075441; 7 pgs.
(Continued)

*Primary Examiner* — Matthew J Merkling
(74) *Attorney, Agent, or Firm* — Maier & Maier, PLLC

(57) ABSTRACT

A high-voltage battery for a motor vehicle having at least one storage element for electrical energy, at least one control unit operating at a voltage lower than the high voltage. A modular unit including at least one switching mechanism and/or at least one fuse as electrical components, wherein the modular unit is attached in a pre-determined position to a housing, externally to this housing that holds the storage element and the control unit, in such a way that when the modular unit is plugged in on the housing, at least two high-voltage contacts of the modular unit, which are connected to at least one of the electrical components of the modular unit, are connected in an electrically conducting manner to assigned high-voltage contacts on the housing side, and at least one contact arrangement of the modular unit.

6 Claims, 2 Drawing Sheets

(51) Int. Cl.
*B60L 50/64* (2019.01)
*B60L 53/16* (2019.01)
*H01M 10/48* (2006.01)
*B60L 11/18* (2006.01)
*H01M 10/42* (2006.01)
*H01H 85/20* (2006.01)

(52) U.S. Cl.
CPC .... *H01M 10/425* (2013.01); *H01H 2085/208* (2013.01); *H01M 10/482* (2013.01); *H01M 2200/00* (2013.01); *H01M 2220/20* (2013.01); *Y02T 10/70* (2013.01); *Y02T 10/7072* (2013.01); *Y02T 90/14* (2013.01)

(56) References Cited

U.S. PATENT DOCUMENTS

| | | | |
|---|---|---|---|
| 2008/0050645 A1* | 2/2008 | Kai | H01M 10/482 429/61 |
| 2009/0295395 A1 | 12/2009 | Bertness | |
| 2010/0112843 A1* | 5/2010 | Heichal | B60L 50/66 439/299 |
| 2012/0244398 A1 | 9/2012 | Youngs et al. | |
| 2012/0263988 A1 | 10/2012 | Obasih et al. | |
| 2013/0108905 A1 | 5/2013 | Murakami et al. | |
| 2014/0193990 A1 | 7/2014 | Zhao et al. | |
| 2014/0342196 A1 | 11/2014 | Thomas et al. | |
| 2015/0057865 A1 | 2/2015 | Stadler et al. | |
| 2017/0021784 A1* | 1/2017 | Wortberg | H05K 9/0098 |

FOREIGN PATENT DOCUMENTS

| | | |
|---|---|---|
| CN | 104284797 A | 1/2015 |
| CN | 104470780 A | 3/2015 |
| EP | 1 829 724 A1 | 9/2007 |
| EP | 2 296 206 A1 | 3/2011 |
| EP | 2 416 407 A1 | 2/2012 |
| WO | 2008/035873 A1 | 3/2008 |
| WO | 2013/188680 A1 | 12/2013 |
| WO | 2015/013158 A1 | 1/2015 |

OTHER PUBLICATIONS

Written Opinion of the International Search Authority dated Jan. 20, 2017 of corresponding International application No. PCT/EP2016/075441; 6 pgs.

International Search Report dated Jan. 20, 2017 of corresponding International application No. PCT/EP2016/075441; 8 pgs.

Examination Report dated Aug. 8, 2016 of corresponding German application No. 10 2015 222 137.7; 5 pgs.

Office Action dated Jul. 2, 2020 in corresponding Chinese Application No. 201680065378.7; 15 pages including English-language translation.

* cited by examiner

HIGH-VOLTAGE BATTERY FOR A MOTOR VEHICLE, AND MOTOR VEHICLE

FIELD

The invention relates to a high-voltage battery for a motor vehicle, having at least one storage element for electrical energy, at least one control unit operated at a voltage lower than the high voltage, and a modular unit comprising at least one contactor and/or at least one fuse as electrical components. In addition, the invention relates to a motor vehicle and a method for installing a modular unit on a housing of a high-voltage battery.

BACKGROUND

Modern motor vehicles with an option for electric drive, which therefore have an electric motor, are usually provided with a high-voltage battery that supplies the electrical energy required for the electric motor. However, even beyond such electric or hybrid motor vehicles, high-voltage batteries in motor vehicles have already been proposed in order to be able to operate specific consumers, for example, air-conditioning systems and the like. Here, in the present case, in the context of motor vehicles, a high voltage shall be understood as any voltage that lies above the usual voltage range for motor vehicles, in particular above 48 V.

Such high-voltage batteries, in particular those that are used in electric or hybrid motor vehicles, for the most part always also have a specific integrated intelligence, which means that a part of the control logic assigned to the high-voltage battery is implemented in the form of control units within the high-voltage battery. For example, as control units, controllers assigned to individual battery cells have already been proposed as storage elements, so that this kind of control unit can monitor the operation of the battery cell or generally the operation of the storage element, and can even influence it as needed. Usually, the lower voltages that are used in motor vehicle on-board networks for miscellaneous consumers, for example, electronic control devices, display means, and the like, are used for such control units as part of the high-voltage battery. In many known motor vehicles, this low voltage amounts to 12 V, partially also to 24 V. Therefore, modern high-voltage batteries also have low-voltage terminals and/or control line terminals in addition to high-voltage terminals.

Another essential component of modern high-voltage batteries are switching means (contactors) and fuses that ensure, on the one hand, an increased safety, but, on the other hand, can ensure by corresponding control that the desired correct voltage is applied to the high-voltage terminals of the high-voltage battery, and the electrical energy taken from the individual storage elements, for example battery cells, is optimized.

Modularly constructed high-voltage batteries, in which a modular unit that contains the switching means (contactors) and fuses is provided, therefore assembled, have already been proposed in the prior art. This kind of modular unit can be designated, for example, as a contactor box or "battery junction box" (BJB). Such modular units are incorporated inside the high-voltage battery, so that the housing of the high-voltage battery, which also contains the storage elements, must be opened up when access to this modular unit is needed. Therefore, an operation under high voltage is indicated, for which reason particularly qualified technical personnel are required.

SUMMARY

The object of the invention is therefore based on providing a possible solution for simplifying maintenance measures relative to a modular unit containing at least one switching means and/or at least one fuse for a high-voltage battery.

In order to achieve this object, in a high-voltage battery of the type named initially, it is provided according to the invention that the modular unit is fastened in a pre-determined position externally to a housing that takes up the storage element plus the control unit, in such a way that when the modular unit is plugged in on the housing, at least two high-voltage contacts of the modular unit, which are connected to at least one of the electrical components of the modular unit, are connected in an electrically conducting manner to assigned high-voltage contacts on the housing side, and at least one contact arrangement of the modular unit comprising at least one supply current contact and/or a control line contact are connected in an electrically conducting manner to an assigned contact arrangement connected to the control unit on the housing side.

In this case, the high-voltage, which is made available by the high-voltage battery and which can be produced, for example, by serial connection of at least one portion of the storage elements that can be formed as battery cells, can be greater than 48 V, in particular, greater than 100 V. The lower voltage required for the control units can amount to 12 V or 24 V, for example. According to the present invention, a connector box or a "battery junction box" (BJB) is also provided here as a modular unit, this box containing all switching means and fuses that are used in order to combine from the voltages of the individual storage elements the high voltage finally to be output by the battery, and to offer safety measures by way of the fuses, in particular, in the case of erroneous interconnections and/or miscellaneous cases of error. Furthermore, it should be noted here that the present invention does not exclude the fact that at least one control unit operating with the lower voltage is installed inside the modular unit, for example, a control unit that relates to the actuating of the switching means and/or fuses. Appropriately, at least one portion of the control units that are installed inside the housing of the high-voltage battery are assigned to groups by at least one storage element (battery cell controller) in each case. Control units of this kind can be designed for the purpose of monitoring the operation of the individual storage elements, and/or to adopt this operation, based on control signals and/or self-established operating conditions.

It is now proposed according to the invention to no longer install the modular unit inside the battery housing, but rather to install it externally on the housing, and the invention is configured so that all contacting that is to be made to other components of the high-voltage battery are automatically produced along with the procedure of mechanical installation of the modular unit. This means that the contactor box in turn has high-voltage contacts and the contact arrangement assigned to the low voltage, wherein, in particular, either the contacts on the housing side or, however, preferably, the contacts on the side of the modular unit protrude, so that ultimately the modular unit is plugged in on the battery housing, during the course of which, the protruding contacts engage in corresponding recesses as uptakes, which contain the contacts belonging to them, so that the contacting is completely produced along with the mechanical assembly, i.e., both for the high-voltage contacts as well as for the contacts assigned to the low voltage or to the control.

Thus, a particularly simple and rapid contacting and discontacting of the connector box results along with the mechanical assembly.

A particularly advantageous enhancement of the present invention provides that a touch protection device is provided at least for the high-voltage contacts for touch protection in the case of any contact produced during the plugging in of the modular unit. Therefore, if the direct connection is executed under touch protection, at least relative to the high-voltage contacts, and the high-voltage connection is produced only after voltage-conducting components can no longer be contacted by tools and/or parts of the human body, an extremely safe contacting and assembly of the modular unit is also possible, in particular, even by persons who are not trained for work with high voltage.

In this context, it is particularly preferred if the high-voltage contacts on the side of the modular unit are designed to protrude from the latter, and the high-voltage contacts on the housing side for the high-voltage contacts on the side of the modular unit are disposed recessed in uptakes, wherein the high-voltage contacts on the modular unit side are surrounded by an insulating material on this modular unit side over a length that is greater than the depth of the uptakes. In this way, at the time point when the high-voltage contacts are mutually contacted, and therefore an electrical connection is produced, it is ensured in any case, that components of the high-voltage contacts on the side of the modular unit that are still touch-protected can be exposed to the outside, and, due to the insulating material, can be touched by a tool or a person working therewith, without causing any risk.

Therefore, lastly in this configuration, a direct plug-in connection is created, which makes possible an assembly/disassembly of the modular unit designed as a connector box, without the need for working on components that are under high voltage.

The modular unit can be appropriately attached to the housing by way of fastening means, in particular screws. Then, at the latest, when the modular unit is attached to the battery housing by the screws, the interfaces formed by the different contacts come into contact.

A particularly appropriate enhancement also results when the housing and the high-voltage unit each have a screening element with screening connectors designed in such a way that they will be connected in an electrically conducting manner when the modular unit is plugged in. The contacting that occurs automatically during assembly can therefore be expanded still further in that it applies also to screening elements that should produce an electrical shielding and are usually provided in the case of high-voltage batteries of this kind. In this way, not only are the high-voltage contacting and the low-voltage contacting that also comprises the ground connection produced automatically during plugging in and assembly, but the shielding connection for EMC is also produced.

The fact that the contacting operations produced between the housing and the modular unit are protected mechanically by the modular unit when the modular unit is assembled is already an advantageous secondary effect of the described high-voltage battery. In this context, it has proven to be a particularly preferred embodiment if at least the high-voltage contacts on the side of the modular unit, in particular also the contact arrangement, are provided with a completely surrounding sealing element for sealing the connection sites against external influences. Here, the sealing element can be designed, for example as a sealing ring. In this way, since the sealing element acts as a seal between the housing and the surface of the modular unit when the modular unit is assembled, it is possible to provide an excellent protection to the contacts and the connection sites against external effects or environmental influences.

In a particularly appropriate way, the high-voltage contacts and the contact arrangement, in particular jointly with the fastening means, are arranged according to the poka-yoke principle. This means that it is essentially ensured that a faulty plugging-in, for example under accidentally erroneous contacting, is excluded as much as possible by selecting the arrangement and embodiment of the respective contacts correspondingly, in particular also by matching, for example, the position of the through-passage holes of screws to the fastening means, and the like. Thus, the assembly will be further simplified and susceptibility to error will be further reduced.

In addition to the high-voltage battery, the invention also relates to a motor vehicle having such a high-voltage battery. All statements made relative to the high-voltage battery according to the invention can be transferred analogously to the motor vehicle according to the invention, with which therefore, the already named advantages can also be obtained. In particular, the electrical energy of the high-voltage battery can be used for operating an electric motor and/or miscellaneous consumers of the motor vehicle.

Finally, the invention also relates to a method for installing a modular unit on a housing of a high-voltage battery of the type according to the invention, which is characterized in that the modular unit is plugged in on the housing with the production of an electrically conducting connection between the high-voltage contacts and the contacts of the contact arrangement. The statements with regard to the high-voltage battery apply also relative to the method according to the invention, so that the named advantages are also achieved with the method. In particular, after plugging in, the mechanical attachment can be still further improved by fastening means, in particular, screws.

BRIEF DESCRIPTION OF THE DRAWINGS

Additional advantages and details of the present invention result from the examples of embodiment described in the following, as well as on the basis of the drawings. Here.

DETAILED DESCRIPTION

Figure 1:
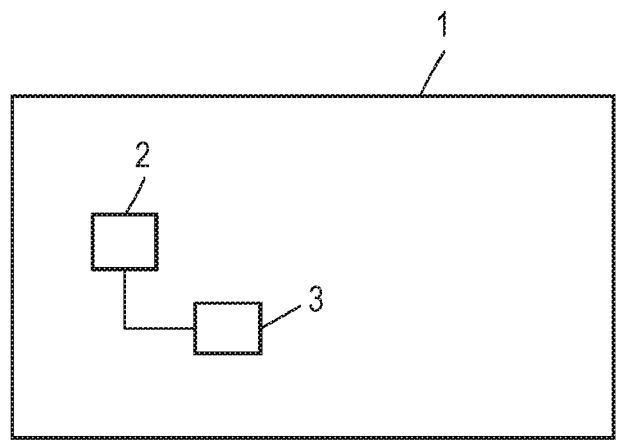
FIG. 1 shows a motor vehicle according to the invention.

FIG. 1 shows a schematic diagram of a motor vehicle 1 according to the invention. It involves an electric motor vehicle or a hybrid motor vehicle, so that it comprises an electric motor 2. For the power supply of the electric motor 2, the latter is connected to a high-voltage battery 3 according to the invention.

Figure 2:
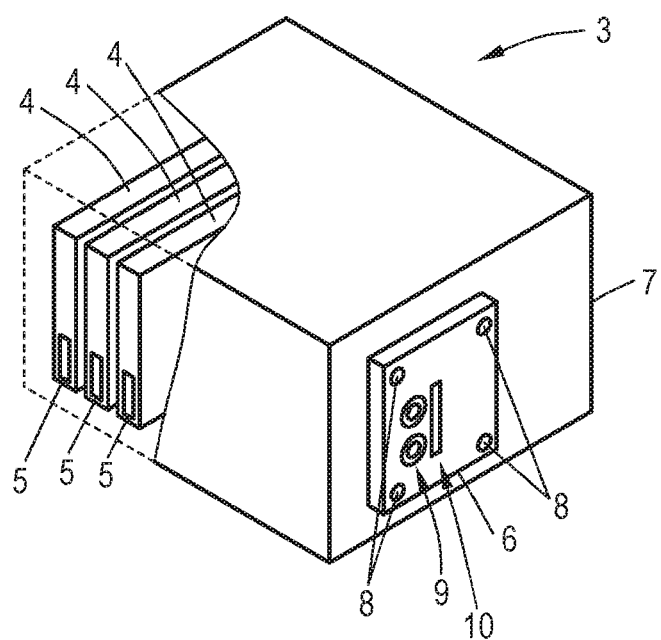
FIG. 2 shows a high-voltage battery according to the invention in an outer view.

The high-voltage battery 3 is shown more precisely in a schematic outer view in FIG. 2, which is cut away in the back region in order to show storage elements 4, which are illustrated in principle and which can be designed as battery cells. In the present case, a control unit 5 is assigned to each of the storage elements 4, this control unit being able to monitor the operation of the particular storage element 4 and adapt it as needed. Whereas the high-voltage battery 3 in the present case supplies a nominal voltage greater than 100 V, in particular greater than 200 V, the control units 5 are operated with the usual on-board network voltage of 12 V as low voltage.

The contactors (switching means) and fuses required for the high-voltage battery 3 are disposed in a modular unit 6 (contactor box), which is disposed, as can be seen, on the outside of a housing 7 of the high-voltage battery containing the storage elements 4. The modular unit 6 is attached to the housing 7 by means of screws 8 and, as can be seen, has on the outside both high-voltage terminals 9 and an insertion site 10 for the low-voltage supply and control lines.

Figure 3:
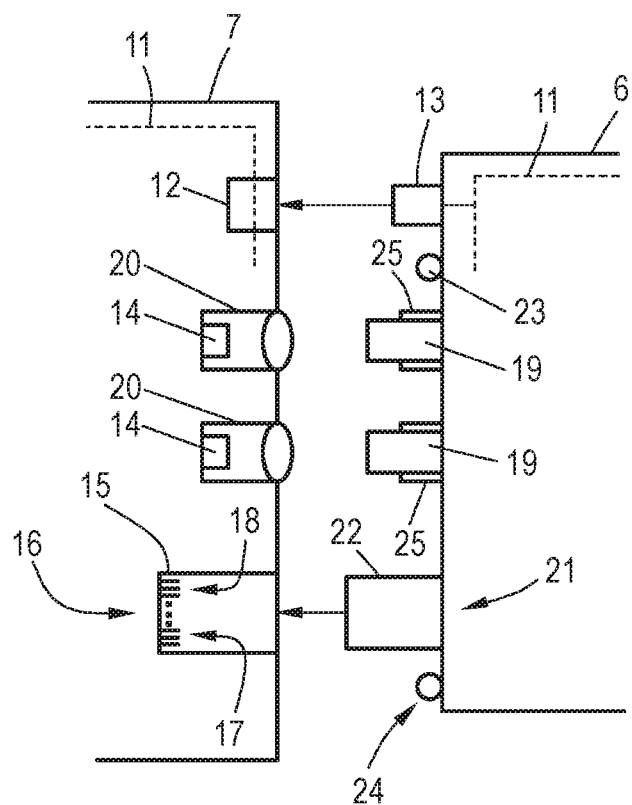
FIG. 3 shows a schematic diagram that explains the plugging in of the modular unit onto the high-voltage battery.

The contacting operation of the modular unit 6 inside the housing takes place when the unit is automatically and forcefully plugged in, as shall be explained in more detail by the schematic diagram of FIG. 3. This figure shows the housing 7 and the modular unit 6 spaced apart from one another during a plugging-in procedure, wherein first it should be noted once more that both the housing 7 and the modular unit 6 have a screening element 11, which is not completely illustrated for reasons of an overview, for electromagnetic shielding, and these screening elements are connected in an electrically conducting manner to a screen connector 12 on the housing side and a screen connector 13 on the side of the modular unit, respectively. Furthermore, present on the housing side are high-voltage contacts 14 and a contact arrangement 16, which is formed as pin header 15, for the low-voltage contacts, which have here supply current contacts 17 and control line contacts 18. Assigned to each of these contacts, on the side of the modular unit, the modular unit 6 possesses high-voltage contacts 19 that protrude from it, whereas the high-voltage contacts 14 are arranged recessed in uptakes 20 on the housing side. Moreover, the modular unit 6 possesses a plug 22 as contact arrangement 21 with corresponding supply current contacts and control line contacts, which are not shown more precisely here for reasons of an overview.

As can easily be seen from FIG. 3, when the modular unit 6 is plugged in, in each case, the connections of the contacts 12, 13, 14, 19, 17, 18 (which are arranged according to the poka-yoke principle), and contacts contained in the plug 22 are automatically produced by the mechanical plugging in process.

The contacts 19 and the contact arrangement 21 of the modular unit 6 are also surrounded by a sealing element 24 formed as a sealing ring 23, which protects the connection sites that are formed against environmental influences.

Figure 4:
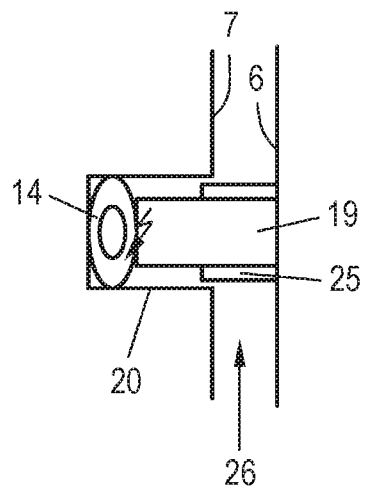
FIG. 4 shows a first detail illustration for the touch protection.
Figure 5:
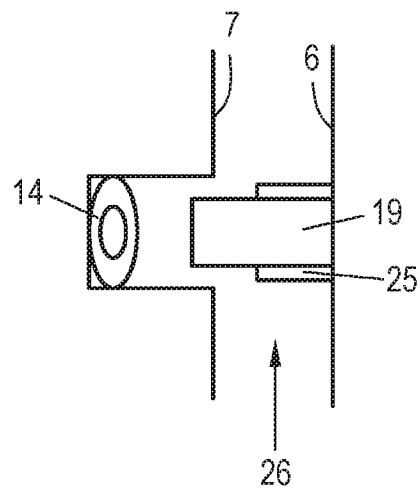
FIG. 5 shows a second detail illustration for the touch protection.

Likewise, as can be seen in FIG. 3, over a certain length, the contacts 19 have a sheathing with insulating material 25 serving as a touch protection device, which will be explained in more detail with respect to FIG. 4 and FIG. 5. FIG. 4 shows a state, in which the electrical contact between the high-voltage contact 19 and the high-voltage contact 14 has just been produced when the modular unit 6 is plugged in. Since the length over which the material 25 covers the contact 19 on the modular unit side is selected greater than the depth of the uptake 20 up to the contact 14, as can be seen, in the gap 26 between the modular unit 6 and the housing 7, there is no exposed electrically conducting surface conveying high voltage; the touch protection is thus provided. For comparison, FIG. 5 shows a situation, in which a part of the electrically conducting surface of the high-voltage contact 19 is actually exposed inside the gap 26, whereby the latter contact is, of course, distanced far from the high-voltage contact 14, so that there is no high voltage risk.

The invention claimed is:

1. A high-voltage battery for a motor vehicle having at least one storage element for electrical energy, at least one control unit operating at a voltage lower than the high voltage, and a modular unit, the modular unit comprising:
   at least one switching means and/or at least one fuse as electrical components,
   wherein the modular unit is attached externally in a pre-determined position onto a housing of the high-voltage battery which holds the storage element and the control unit,
   wherein the modular unit is attached in such a way that when the modular unit is plugged in on the housing, at least two high-voltage contacts of the modular unit, which are connected to at least one of the electrical components of the modular unit, are connected in an electrically conducting manner to assigned high-voltage contacts on a housing side,
   wherein at least one contact arrangement of the modular unit comprises at least one supply current contact and/or at least one control line contact connected in an electrically conducting manner to an assigned contact arrangement connected to the control unit on the housing side,
   wherein the high-voltage contacts on a modular unit side are designed to protrude from the modular unit, and the high-voltage contacts on the housing side are arranged recessed in uptakes,
   wherein a touch protection device is provided at least for the high-voltage contacts for touch protection when a contact is produced during the plugging in of the modular unit, the touch protection device comprising an insulating material surrounding the modular side high-voltage contacts over a length that is greater than a depth of the corresponding housing side uptakes, and
   wherein the housing and the modular unit each individually have a screening element with screen connectors designed in such a way that the screen connectors are connected in an electrically conducting manner when the modular unit is plugged in.

2. The high-voltage battery according to claim 1, wherein in that the modular unit is attached to the housing by way of fastening means, in particular screws.

3. The high-voltage battery according to claim 1, wherein a sealing element is provided completely surrounding at least the high-voltage contacts on the side of the modular unit, in particular also the contact arrangement in order to seal connection sites against external influences.

4. The high-voltage battery according to claim 3, wherein the sealing element is a sealing ring.

5. The high-voltage battery according to claim 1, wherein in that the high-voltage contacts and the at least one contact arrangements, in particular jointly with a fastening means, are arranged according to the poka-yoke principle.

6. A method for installing a modular unit onto a housing of a high-voltage battery according to claim 1, wherein in that the modular unit is plugged onto the housing with the production of an electrically conducting connection between the high-voltage contacts and the contacts of the contact arrangements.

* * * * *